United States Patent
Eom et al.

(10) Patent No.: US 9,468,048 B2
(45) Date of Patent: Oct. 11, 2016

(54) INPUT CURRENT REGULATOR, DRIVING METHOD THEREOF, AND DISABLE CIRCUIT THEREOF

(75) Inventors: Hyun-Chul Eom, Seoul (KR); Seunguk Yang, Anyang (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 481 days.

(21) Appl. No.: 13/477,869

(22) Filed: May 22, 2012

(65) Prior Publication Data
US 2012/0299572 A1 Nov. 29, 2012

Related U.S. Application Data

(60) Provisional application No. 61/488,957, filed on May 23, 2011.

(30) Foreign Application Priority Data

May 16, 2012 (KR) ......................... 10-2012-0052180

(51) Int. Cl.
*H05B 33/08* (2006.01)

(52) U.S. Cl.
CPC ......... *H05B 33/0815* (2013.01); *Y02B 20/347* (2013.01)

(58) Field of Classification Search
CPC .......... H05B 33/0815; H05B 33/0839; H05B 33/0836; H02M 1/42; H02M 3/33507; H02M 3/33592; Y02B 20/347
USPC ................ 315/291, 224, 244, 200 R, 209 R, 315/246–247, 306–308; 323/222, 312, 313; 363/21.02, 69
See application file for complete search history.

(56) References Cited

U.S. PATENT DOCUMENTS

| | | | | |
|---|---|---|---|---|
| 7,863,870 B2* | 1/2011 | Nathan | ................... | H02M 1/32 323/222 |
| 8,542,509 B2* | 9/2013 | Sagneri | ................. | H02M 3/158 363/69 |
| 8,841,862 B2* | 9/2014 | Lee | ...................... | H05B 33/083 315/185 R |
| 2010/0090607 A1* | 4/2010 | Vos | ............................... | 315/186 |
| 2010/0164406 A1* | 7/2010 | Kost et al. | ..................... | 315/307 |
| 2010/0308739 A1* | 12/2010 | Shteynberg et al. | ......... | 315/193 |
| 2011/0140620 A1* | 6/2011 | Lin et al. | ...................... | 315/224 |
| 2012/0262084 A1* | 10/2012 | Liu | ............................... | 315/250 |
| 2012/0274216 A1* | 11/2012 | Datta | ............................ | 315/127 |
| 2013/0242625 A1* | 9/2013 | Yan et al. | ...................... | 363/49 |

OTHER PUBLICATIONS

LM3450 LED Driver with Active Power Factor Correction and Phase Dimming Decoder, Nov. 18, 2010, pp. 1-28, National Semiconductor Corporation.

* cited by examiner

*Primary Examiner* — Haissa Philogene
(74) *Attorney, Agent, or Firm* — Okamoto & Benedicto LLP

(57) ABSTRACT

The present invention relates to a dimmer and an input current regulator provided in a power supply. The input current regulator includes: a bleeding circuit generating a bleeding current from an input current passed through the dimmer; a sensing circuit sensing the input current, and controlling the bleeding circuit according to a sense voltage corresponding to the input current; and a biasing circuit generating a power voltage for operation of the input current regulator during operation of the power supply. The input current includes a bleeding current and a power current supplied to the power supply.

26 Claims, 5 Drawing Sheets

INPUT CURRENT REGULATOR, DRIVING METHOD THEREOF, AND DISABLE CIRCUIT THEREOF

CROSS-REFERENCE TO RELATED APPLICATION

This application claims priority to and the benefit of U.S. Patent Application No. 61/488,957 filed in the USPTO on May 23, 2011, and Korean Patent Application No. 10-2012-0052180 filed in the Korean Intellectual Property Office on May 16, 2012, the entire contents of which are incorporated herein by reference.

BACKGROUND OF THE INVENTION (a) Field of the Invention

The present invention relates to an input current regulator, a driving method thereof, and a circuit that disables an input current regulator.

(b) Description of the Related Art

A triac dimmer passes each cycle of a sine wave of an AC input by a dimming angle. In order to maintain the triac dimmer in a turn-on state, more than a predetermined holding current should flow through the dimmer.

When a current (hereinafter, referred to an input current) flowing through the dimmer is smaller than the holding current, the dimmer is turned off. When the input current is iteratively greater than or smaller than the holding current, the dimmer is iteratively turned on/off, causing flicker.

In order to prevent occurrence of flicker, a bleeder is used to maintain the input current to be greater than the holding current. The bleeder is provided between the dimmer and a power supply. In this case, a rectification circuit may be disposed between the dimmer and the bleeder.

A typical bleeder senses an input voltage passed through the rectification circuit and determines the input current to be smaller than the holding current when the sensed input voltage is lower than a predetermined reference level. When the input current is determined to be smaller than the holding current, the bleeder generates a current to compensate a difference of the two currents.

The current generated by the bleeder is not a current varying to compensate the difference of the two currents but a constant current. Thus, a current remaining after compensation of the difference of the two currents is wasted. Due to increase of power consumption, an operation temperature of the bleeder is increased.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an input current regulator that can reduce undesired power consumption due to a current flowing to a bleeder, a driving method of the input current regulator, and a disable circuit of an input current regulator.

A dimmer and an input current regulator provided in a power supply according to an exemplary embodiment of the present invention includes: a bleeding circuit generating a bleeding current from an input current passed through the dimmer; a sensing circuit sensing the input current, and controlling the bleeding circuit according to a sense voltage corresponding to the input current when the sensed input current is smaller than a predetermined holding current; and a biasing circuit generating a power voltage for operation of the input current regulator during operation of the power supply.

The biasing circuit generates the power voltage using an auxiliary voltage generated in an auxiliary coil coupled in an insulated manner with a primary side coil of the power supply with a predetermined turn ratio.

The sensing circuit generates a sink current controlling a source current supplied to the bleeding circuit from the biasing circuit. The sensing circuit includes a shunt regulator provided between a reference end and an input end to receive the sensing voltage and generating a sink current to the input end from an output end to maintain the sensing voltage with a predetermined reference voltage.

The sensing circuit further includes a first resistor connected between the input end and the reference end of the shunt regulator. The sensing circuit further includes a capacitor coupled to the first resistor in parallel to filter the sensing voltage generated in the first resistor.

The bleeding circuit includes: a first resistor having a first end connected to a rectification circuit and the power supply; and a transistor having a first electrode connected to a second end of the first resistor and a control electrode connected to the output end of the shunt regulator.

The bleed circuit includes a second resistor connected between a second electrode of the transistor and the reference end of the shunt regulator.

The sensing circuit includes a BJT (bipolar junction transistor) receiving a sense voltage according to the input current as a voltage difference between a control electrode and a first electrode, and a sink current according to the voltage different flows to the first electrode of the BJT from the second electrode of the BJT.

The bleeding circuit includes a first resistor having a first end connected to a rectification circuit and the power supply and a transistor having a first electrode connected to a second end of the first resistor and a control electrode connected to a second electrode of the BJT.

The bleeding circuit comprises a second resistor connected between a second electrode of the transistor and a control electrode of the BJT.

The biasing circuit includes a diode connected to the auxiliary voltage and a capacitor charged by a current flowing through the diode, and the power voltage is a voltage charged in the capacitor.

The sensing circuit includes a shunt regulator having a reference end, an input end, and an output end, receiving a sense voltage according to the input current between the reference end and the input end, and generating a sink current flowing to the input end from the output end according to the sense voltage, and a capacitor of the biasing circuit has a first end connected to the output end of the shunt regulator through a resistor and a second end connected to an input end of the shunt regulator.

The bleeding circuit includes a transistor having a control electrode connected to the output end of the shunt regulator, a first electrode connected to the dimmer through a third resistor, and a second electrode connected to the reference end of the shunt regulator through a fourth resistor.

The sensing circuit includes a BJT receiving a sense voltage according to the input current as a voltage difference between a control electrode and a first electrode, a sink current according to the voltage difference flows to a first electrode of the BJT from a second electrode of the BJT, and a capacitor of the biasing circuit includes a first end connected with the second electrode of the BJT through a fifth resistor and a second end connected to the first electrode of the BJT.

The bleeding circuit includes a control electrode connected to the second electrode of the BJT, a first electrode connected to the dimmer through a third resistor, and a second electrode connected to a control electrode of the BJT through a fourth resistor.

The sensing circuit senses an input current using the sum of the bleeding current and a current supplied from the power supply, and the current supplied to the sensing circuit from the power supply is a current flowing to a switch that controls power transmission of the power supply.

A disable circuit according to another exemplary embodiment of the present invention is connected to the input current regulator, and includes: a dimming angle sensing circuit generating a comparison voltage according to a comparison result of an input voltage generated from rectification of an AC input that has passed through the dimmer and generating a dimming angle sense voltage corresponding to a dimming angle of the dimmer by low-pass filtering the comparison voltage; and a dimming angle shunt regulator connected when a voltage between a reference end receiving the diming angle sense voltage and an input end is higher than a predetermined dimming angle reference voltage to generate a sink current flowing to the input end from an output end to which the power voltage is supplied.

The comparing circuit includes a zener diode receiving the input voltage from a sixth resistor and connected when the input voltage is higher than the zener voltage, and the comparison voltage is a voltage of a first node where the sixth resistor and the zener diode are connected.

The filtering circuit includes seventh and eighth resistors connected between the comparison voltage and a ground and a capacitor connected between a node where the seventh and eighth resistors are connected and the ground, and the dimming angle sense voltage is a voltage of the second node.

The ground of the disable circuit is connected to the ground of the input current regulator, or may be connected to the ground of the power supply.

A driving method of a dimmer and an input current regulator provided in a power supply according to another exemplary embodiment of the present invention includes: generating a sink current according to a sense voltage that depends on an input current passed through the dimmer; generating a power voltage for operation of the input current regulator during operation of the power supply connected to the dimmer; and controlling a bleeding current among the input current, excluding a current supplied to the power supply, according to the sink current.

The controlling of the bleeding current includes variation of a voltage supplied to a control electrode of the transistor by the power voltage according to the sink current, and the bleeding current flows through the transistor.

The generating the sink current includes generating a sense voltage from flow of the sum of a current flowing to a switch that controls power transmission of the power supply and the bleeding current to a resistor.

The driving method of the input current regulator includes: generating a comparison voltage according to a comparison result of an input voltage generated by rectifying a dimmer-passed AC input and a zener voltage; generating a dimming angle sense voltage corresponding to a dimming angle of the dimmer by low-pass filtering the comparison voltage; and decreasing of the power voltage by a sink current when the dimming angle sense voltage is higher than a predetermined dimming angle reference voltage.

According to the exemplary embodiments of the present invention, an input current regulator that can power consumption due to a current flowing to a bleeder, a driving method of the input current regulator, and a disable circuit of the input current regulator can be provided.

DETAILED DESCRIPTION OF THE EMBODIMENTS

Figure 1:
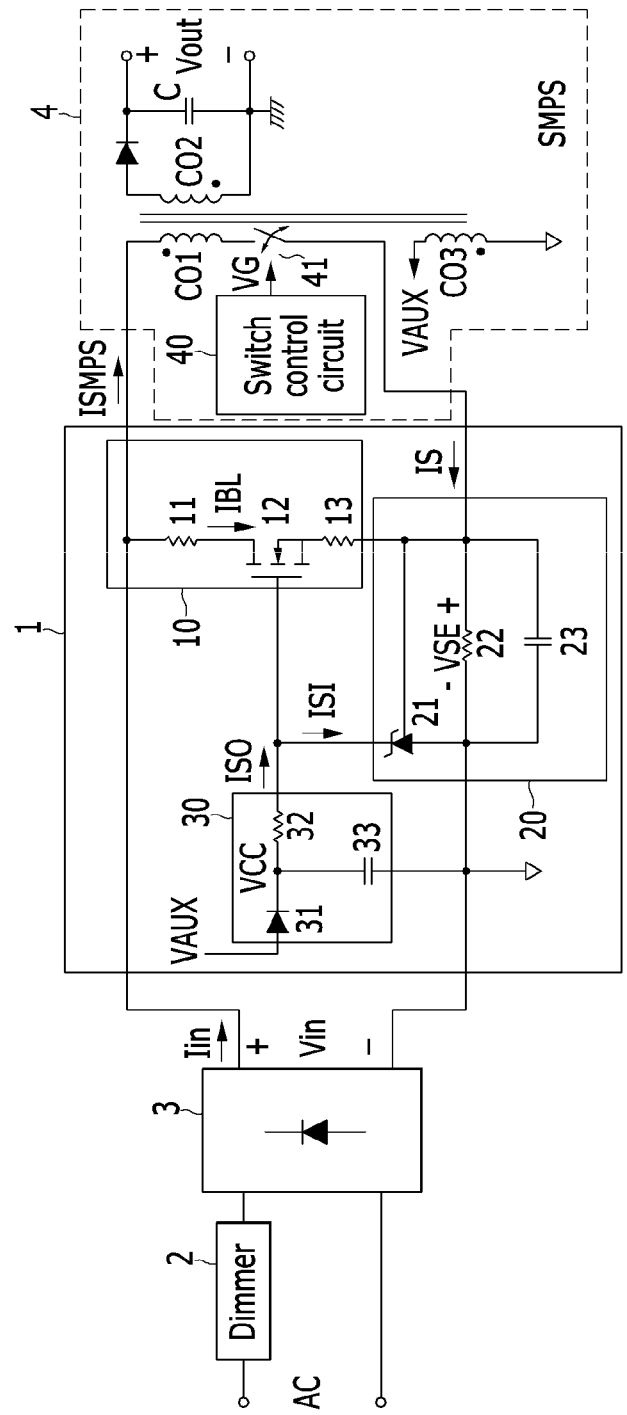
FIG. 1 shows an input current regulator according to a first exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

FIG. 1 shows an input current regulator according to a first exemplary embodiment of the present invention.

An input current regulator 1 senses an input current Iin. When the sensed input current Iin is smaller than a holding current, the input current regulator 1 generates a compensation current corresponding to a difference between the sensed input current and the holding current and holds the input current Iin as a holding current.

In addition, the input current regulator 1 is driven by being synchronized by a power supply connected to the input current regulator 1. In further detail, when a switch mode power supply (SMPS) 4 is used as the power supply, the input current regulator 1 is activated only during a period that the SMPS 20 performs switching operation.

As shown in FIG. 1, the input current regulator 1 is connected between a bridge diode 3 and an SMPS 4. The bridge diode 3 is an example of a rectification circuit, and the SMPS 4 is an example of the power supply.

An AC input AC is input to the bridge diode 3 through a dimmer 2. The dimmer 2 passes a part of the AC input AC, corresponding to a diming angle among one cycle, and the dimmer 2 is not activated when a current flowing to the dimmer 2 is smaller than the holding current. The part of the AC input AC passing through the dimmer 2 among one cycle is increased as the dimming angle is increased.

The AC input AC passed through the bridge diode 3 is rectified such that an input voltage Vin and an input current Iin are generated.

The input current regulator 1 senses the input current Iin, and regulates the input current Iin to a holding current using a bleeding current when the sensed input current is smaller than the holding current. Accordingly, the input current Iin is controlled to be higher than the holding current.

The input current regulator 1 includes a bleeding circuit 10, a sensing circuit 20, and a biasing circuit 30.

The bleeding circuit 10 generates a bleeding current IBL. The bleeding circuit 10 includes a first resistor 11, a second resistor 13, and a MOSFET 12. The MOSFET 12 according to the exemplary embodiment of the present invention is realized as an N-channel type transistor, but the present invention is not limited thereto.

A first end of the first resistor 11 is connected to the bridge diode 3 and an input end of the SMPS 4. A first electrode (i.e., a drain electrode) of the MOSFET 12 is connected to a second end of the first resistor 11, and a second electrode (i.e., a source electrode) of the MOSFET 12 is connected to a first end of the second resistor 13. A control electrode (i.e., a gate electrode) of the MOSFET 12 is connected to the sensing circuit 20 and the biasing circuit 30, and a voltage applied to the gate electrode controls the bleeding current IBL.

The first resistor 11 may function to distribute heat generated from flowing of the bleeding current IBL to the MOSFET 12, and the second resistor 13 can prevent sudden flow of the bleeding current IBL to the MOSFET 12 by providing a negative feedback to the MOSFET 12.

The sensing circuit 20 senses the bleeding current IBL and a switch current IS, and controls the bleeding circuit 10 to make the sum of the two currents reach a predetermined reference current. In order to control the bleeding circuit 10, the sensing circuit 20 generates a sink current ISI to control a gate voltage of the MOSFET 12.

The input current Iin is the sum of the bleeding current IBL and a current (hereinafter, referred to as a power current) supplied to the SMPS 4. The switch current IS supplied to the sensing circuit 20 corresponds to a power current ISMPS.

The reference current corresponds to the holding current. When the sum of the bleeding current IBL and the switch current IS is the reference current, the reference current is set to make the sum of the bleeding current IBL and the power current ISMPS the holding current.

The sensing circuit 20 includes a shunt regulator 21, a resistor 22, and a capacitor 23.

The shunt regulator 21 includes a reference end connected to a first end of the resistor 22, an output end connected to a gate of the MOSFET 12, and an input end connected to a second end of the resistor 22.

The capacitor 23 is coupled to the resistor 22 in parallel to filter a sense voltage VSE generated from the resistor 22. The sum of the bleeding current IBL and the switching current IS flows to the resistor 22.

The shunt regulator 21 according to the first exemplary embodiment of the present invention generates a sink current to hold the sense voltage VSE that corresponds to a voltage difference between a reference end and an input end to a reference voltage. In this case, the reference voltage corresponds to a voltage corresponding to a reference current, and when the sense voltage VSE is equivalent to the reference voltage, the sum of the bleeding current IBL and the switch current IS is set to be equivalent to the reference current.

When the sense voltage VSE is higher than the reference voltage, the shunt regulator 21 is conductive such that a sink current ISI flowing from an output end to an input end of the shunt regulator is generated. The sink current ISI turns on the MOSFET 12 by decreasing a gate voltage of the MOSFET 12. The bleeding current IBL is decreased while the gate voltage is decreased by the decreasing of the sink current ISI, and when the MOSFET 12 is turned off, the bleeding current IBL does not flow.

The capacitor 23 low-pass filters the sense voltage VSE such that the waveform of the low-pass filtered sense voltage becomes similar to the input current Iin. Since the switch current IS is generated during a turn-on period of the switch 41 of the SMPS, the waveform of the sense voltage VSE generated by the sum of two currents, passed through the resistor 22 may be different from the waveform of the input current Iin.

That is, no switch current IS is generated while a turn-off period of the switch 41, the sense voltage VSE may include a ripple component. In order to remove the ripple component and sense the input current Iin, the sensing circuit 20 filters the sense voltage VSE using the capacitor 23.

The biasing circuit 30 generates a power voltage VCC for operation of the input current regulator 1 using an auxiliary voltage VAUX generated in an auxiliary coil CO3. Since the power voltage VCC is not generated unless the auxiliary voltage VAUX is generated, the input current regulator 1 is not operated.

When the SMPS 4 is not operated, the auxiliary voltage VAUX is not generated. The auxiliary voltage VAUX is generated by switching operation of the switch 41. When the SMPS 4 is not operated, no power current ISMPS is generated, and accordingly, no switch current IS is generated.

In this case, the input current regulator 1 may generate a significantly high bleeding current IBL may be generated to compensate a switch current IS not input thereto. In order to prevent this, the biasing circuit 30 does not generate the power voltage VCC when the SMPS 4 is not operated.

That is, as shown in FIG. 1, the biasing circuit 30 generates the power voltage VCC using the auxiliary voltage VAUX that is generated only when the SMPS 4 is operated.

The biasing circuit 30 includes a diode 31, a resistor 32, and a capacitor 33.

The diode 31 includes an anode to which the auxiliary voltage VAUX is input and a cathode connected to the resistor 32 and the capacitor 33.

The capacitor 33 is connected to the cathode of the diode 31 such that the capacitor 33 generates the power voltage VCC by being charged when the auxiliary voltage VAUX turns on the diode 31.

The resistor 32 is connected to the cathode of the diode 31 and a gate of the cathode and MOSFET 12. Through the resistor 32, a source current ISO that increases a voltage of the gate of the MOSFET 12 is supplied. When the source current ISO is supplied to the gate of the MOSFET 12, the gate voltage is increased. When the gate voltage is increased, the MOSFET 12 is turned on and the bleeding current IBL is increased.

The SMPS 4 controls power transmission between a first coil CO1 formed in a primary side and a second coil CO2 formed in a secondary side according to the switching operation of the switch 41.

The SMPS 4 includes a switch control circuit 40, a switch 41, first to third coils CO1 to CO3, a rectifying diode D, and an output capacitor C.

The first coil CO1 and the third coil CO3 are coupled in an insulated manner with a predetermined turn ratio. The auxiliary voltage VAUX generated in the third coil CO3 is a voltage corresponding to a both-end voltage of the switch 41, and voltage variation generated during the switching operation of the switch 41 is reflected to the third coil CO3 such that the auxiliary voltage VAUX is generated.

A current flows through the rectifying diode D connected to the second coil CO2, and a voltage charged in the output capacitor C is an output voltage of the SMPS 4.

The switch control circuit 40 receives an output voltage VOUT as a feedback, and generates a gate signal VG for controlling the switch 41.

In the first exemplary embodiment of the present invention, the shunt regulator is used but the present invention is not limited thereto. In a second exemplary embodiment of the present invention, a BJT element is used instead of the shunt regulator.

The second exemplary embodiment of the present invention will be described with reference to FIG. 2, and the same constituent elements of the first exemplary embodiment will have the same reference numerals. Further, the same configuration will not be further described.

Figure 2:
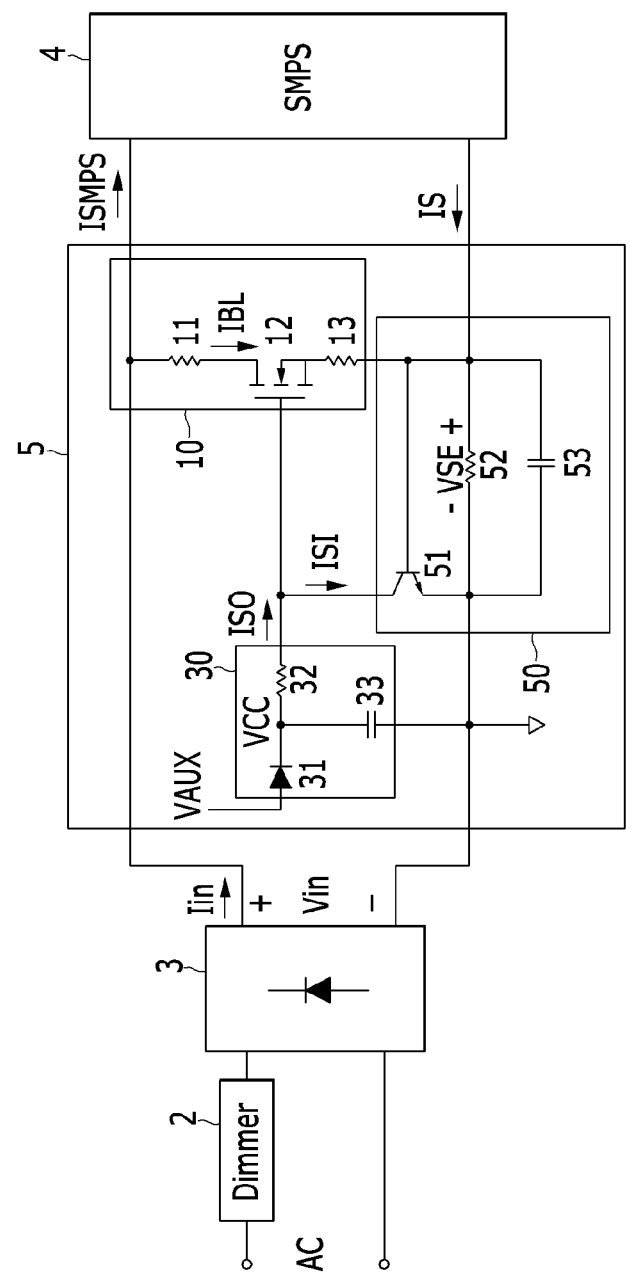
FIG. 2 shows an input current regular according to a second exemplary embodiment of the present invention.

FIG. 2 shows an input current regulator according to the second exemplary embodiment of the present invention.

As shown in FIG. 2, a sensing circuit 50 of an input current regulator 5 includes a BJT 51.

A resistor 52 is connected between a control electrode (hereinafter, referred to as a base) and a first electrode (hereinafter, referred to as an emitter) of the BJT 51, and a second electrode (hereinafter, referred to as a collector) of the BJT 51 is connected to a gate of the MOSFET 12. A capacitor 53 is coupled in the 52 in parallel.

Functions of the resistor 52 and the capacitor 53 are the same as those of the resistor 22 and the capacitor 23.

When a sense voltage VSE is higher than a threshold voltage of the BJT 51, the BJT 51 is turned on, and a sink current ISI is generated according to the sense voltage VSE. A base-emitter voltage of the BJT 51 is increased as the sense voltage VSE is increased so that the sink current ISI is increased. Then, a gate voltage of the MOSFET 12 is decreased and thus a bleeding current IBL is decreased or the MOSFET 12 is turned off.

When the sense voltage VSE is lower than the threshold voltage of the BJT 51, the BJT 51 is turned off. Then, the gate voltage of the MOSFET 12 is decreased by a source current ISO so that the MOSFET 12 is turned on or the bleeding current IBL is increased.

The first exemplary embodiment is the same as the second exemplary embodiment, excluding a configuration for controlling the sink current ISI in the sensing circuit 20. The reference voltage of the first exemplary embodiment may be set to be equivalent to the threshold voltage of the second exemplary embodiment.

Figure 3:
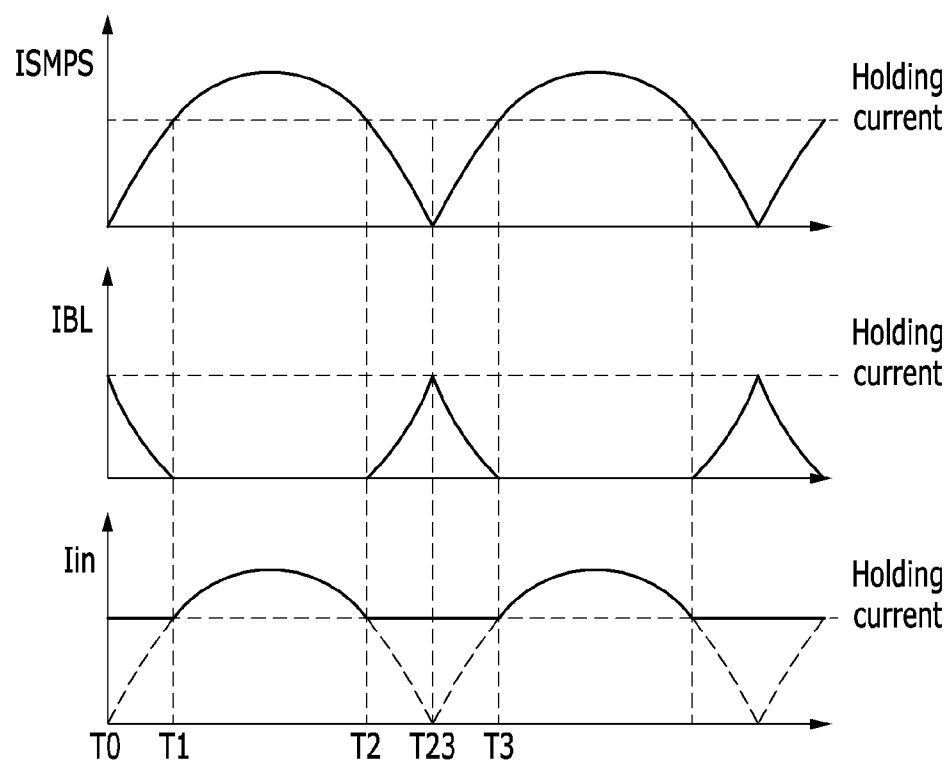
FIG. 3 is a waveform diagram of a power current, a bleeding current, and an input current according to an exemplary embodiment of the present invention.

FIG. 3 is waveforms of the power current, the bleeding current, and the input current according to an exemplary embodiment of the present invention.

As shown in FIG. 3, the power current IMPS that is a sine wave full-rectified from the bridge diode 3 is smaller than a holding current in periods T0 to T1 and T2 to T3.

In this case, as marked by dotted lines, the input current Iin is also smaller than the holding current in the periods T0 to T1 and T2 to T3.

Then, in case of the first exemplary embodiment, the sense voltage VSE becomes lower than the reference voltage of the shunt regulator 21 so that the shunt regulator 21 do not generate the sink current ISI.

In case of the second exemplary embodiment, the sense voltage VSE becomes lower than the threshold voltage so that the BJT 51 do not generate the sink current ISI.

Then, the gate voltage of the MOSFET 12 is increased by the source current ISI so that the bleeding current IBL is increased. The bleeding current IBL is increased enough to compensate a difference between the input current Iin and the holding current. Thus, the bleeding current IBL is generated as much as a difference between the holding current and the power current ISMPS during the periods T0 to T1 and T2 to T3.

Then, as marked by the solid lines, the input current Iin is maintained as the holding current during the corresponding period.

Since the sense voltage VSE is higher than the reference voltage or the threshold voltage during the period T1 to T2 during which the power current ISMPS is higher than the holding current, the sink current ISI is generated by the shunt regulator 21 and the BJT 51. Accordingly, the gate voltage of the MOSFET 12 is decreased and thus the MOSFET 12 is maintained in the turn-off state.

In further detail, the power current ISMPS start to decrease lower than the holding current after the time point T2. Then, the sense voltage VSE becomes lower than the reference voltage so that the sink current ISI is blocked, and the gate of the MOSFET 12 starts to be charged by the source current ISO. The MOSFET 12 is turned by the source current ISO after the time point T2, and the bleeding current IBL is generated after the time point T2. As the gate voltage is increased by the source current ISO after the time point T2, the bleeding current IBL is also increased.

When the power current ISMPS starts to increase after a time point T23, a time point at which the sense voltage VSE becomes higher than the reference voltage by the bleeding current IBL may occur. Then, the shunt regulator 21 generates the sink current ISI to decrease the gate voltage of the MOSFET 12 such that bleeding current IBL is decreased. Such an operation is continuously generated during an increase period of the power current ISMPS.

When the increasing power current ISMPS becomes higher than the holding current, the sense voltage VSE is higher than the reference voltage and thus the shunt regulator 21 generates the sink current ISI. The gate voltage of the MOSFET 12 is decreased by the sink current ISI so that the MOSFET 12 is turned off.

During the period T1 to T2 during which the power current ISMPS is higher than the holding current, the source current ISO and the sink current ISI are attenuated with each other so that the gate of the MOSFET 12 is not charged and maintained in the turn-off state. Thus, no bleeding current IBL is generated.

The BJT 51 is operated the same as the shunt regulator 21.

As described, the bleeding current IBL is only generated during a period that the input current Iin is lower than the holding current, and therefore unnecessary power consumption and temperature increase can be prevented.

In addition, since being synchronized by operation of the SMPS 4, no bleeding current IBL is generated for a period during the SMPS 4 is not operated, and accordingly the input current regulator can be protected.

According to the third exemplary embodiment of the present invention, a dimming angle can be sensed using the input voltage Vin, and when the dimming angle is higher than a predetermined level, the input current regulator can be disabled. Since the power current ISMPS is sufficiently high when the dimming angle is large, the bleeding current IBL may not need to be generated when the dimming angle is large.

In the third exemplary embodiment of the present invention, a disable circuit that blocks an unnecessary bleeding current by disabling the input current regulator when the sensed dimming angle is large is further included.

Figure 4:
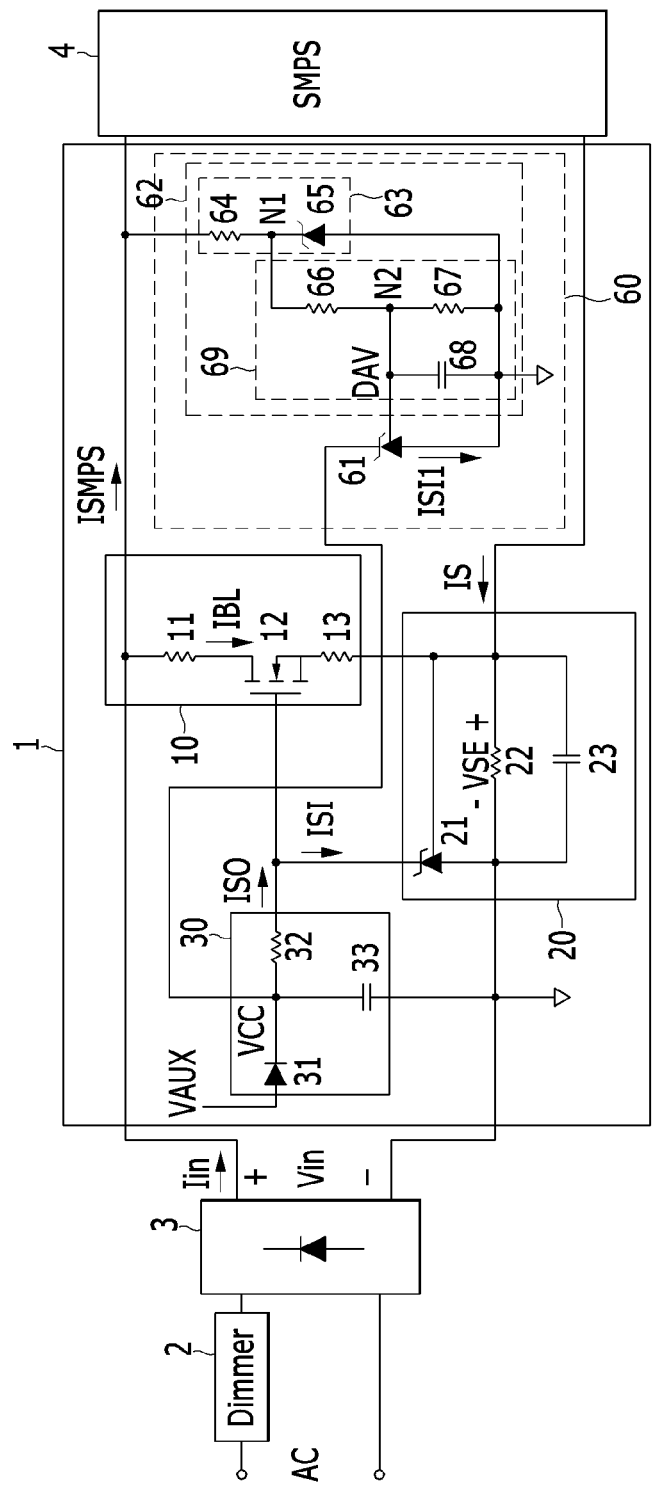
FIG. 4 shows a configuration of a disable circuit according to a third exemplary embodiment of the present invention.

FIG. 4 shows a configuration of the disable circuit according to the third exemplary embodiment of the present invention. As shown in FIG. 4, a disable circuit 60 is connected to the input voltage Vin, the power voltage VCC, and the ground.

The disable circuit 60 includes a dimming angle shunt regulator 61 and a dimming angle sensing circuit 62. The dimming angle sensing circuit 62 includes a comparing circuit 63 and a filtering circuit 69.

The comparing circuit 63 receives the input voltage Vin, and outputs a comparison result of the input voltage Vin and a zener voltage VZENER. The comparing circuit 63 includes a resistor 64 and a zener diode 65.

A first end of the resistor 64 is connected to the input voltage Vin, and a second end of the resistor 64 is connected to a cathode of the zener diode 65. An anode of the zener diode 65 is grounded.

When the input voltage Vin is higher than the zener voltage VZENER of the zener diode 65, the zener diode 65 is connected and a voltage of a node N1 becomes the zener voltage VZENER. When the input voltage Vin is lower than the zener voltage VZENER, the voltage of the node N1 becomes the input voltage Vin. Hereinafter, the voltage of the node N1 is referred to as a comparison voltage VCOM.

As described, the comparing circuit 63 generates a comparison voltage VCOM according to a comparison result of the input voltage Vin and the zener voltage VZENER.

As a low pass filter, the filtering circuit 69 filters a high-frequency component of the comparison voltage VCOM to generate a dimming angle voltage DAV. The filtering circuit 69 includes two resistors 66 and 67 and a capacitor 68.

A first end of the resistor 66 is connected to the node N1, and a second end of the resistor 66 is connected to a node N2. A first end of the resistor 67 is connected to the node N2, and a second end of the resistor 67 is grounded. A first end of the capacitor 68 is connected to the node N2, and a second end of the capacitor 68 is grounded. The node N2 is connected to a reference end of the dimming angle shunt regulator 61, and the dimming angle voltage DAV is input to the reference end.

The dimming angle shunt regulator 61 includes an output end connected to the power voltage VCC, an input end connected to the ground, and the reference end. The dimming angle shunt regulator 61 generates a sink current to maintain the dimming angle voltage DAV that is a difference between the reference end and the input end with a predetermined dimming angle reference voltage.

Thus, when the dimming angle voltage DAV is higher than the dimming angle reference voltage, the dimming angle shunt regulator 61 is connected such that a sink current ISI1 flowing from the output end of the shunt regulator 61 to the input end thereof. Then, the capacitor 33 of the biasing circuit 30 is discharged and thus the power voltage VCC is decreased to zero voltage, and the transistor 12 is turned off so that no bleeding current IBL is generated.

In FIG. 4, a disable circuit is illustrated in combination with the first embodiment, but the present invention is not limited thereto. The disable circuit may be combined with the second exemplary embodiment. When the disable circuit is combined with the second exemplary embodiment, the disable circuit 60 is connected with the input voltage Vin, the power voltage VCC, and the ground, and a configuration and operation thereof are equivalent to the above-described exemplary embodiment.

Further, in the third exemplary embodiment of the present invention, disable circuit 60 is included in the input current regulator, but it may be separately provided. In addition, in FIG. 4, the disable circuit 60 is connected to a ground (i.e., −VSE) of the input current regulator 1, but the present invention is not limited thereto. The ground of the disable circuit 60 may be connected to a ground (+VSE) of the SMPS 4.

Figure 5:
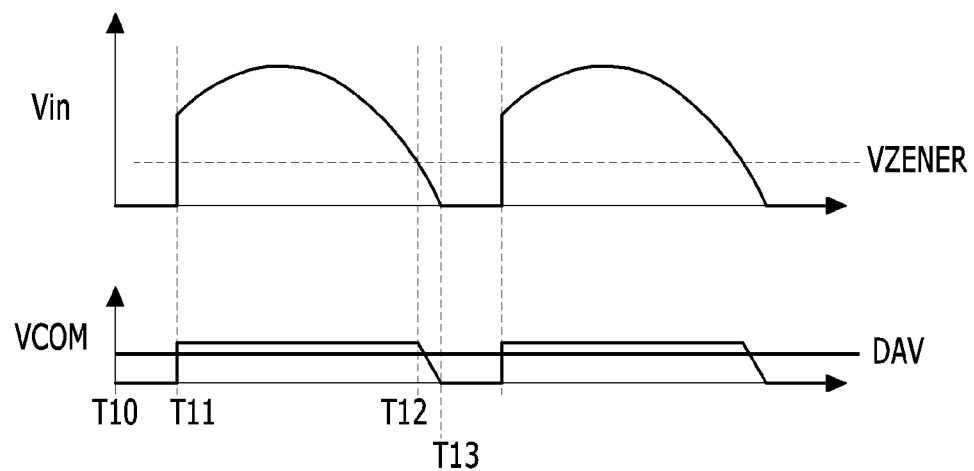
FIG. 5 shows a comparison voltage and a dimming angle sensing voltage according to an input voltage according to the third exemplary embodiment of the present invention.

FIG. 5 shows a comparison voltage and a dimming angle sensing voltage according to an input voltage according to the third exemplary embodiment of the present invention.

As shown in FIG. 5, a period T11 to T13 among a period T10 to T13, which is one cycle of the input voltage Vin corresponds to a dimming angle. Accordingly, the input voltage Vin is not generated during the period T10 to T11.

Since the input voltage Vin is lower than the zener voltage VZENER during the period T10 to T11, the comparison voltage VCOM is equivalent to the input voltage.

At a time point T11, the input voltage Vin is generated as a higher voltage than the zener voltage VZENER, and the input voltage Vin is higher than the zener voltage VZENER until a time point T12. Accordingly, a period T11 to T12, the comparison voltage VCOM is maintained as the zener voltage VZENER.

When the input voltage Vin becomes lower than the zener voltage VZENER at a time point T12, the comparison voltage becomes equivalent to the input voltage Vin.

As described, during one cycle of the input voltage Vin, the comparison voltage VCOM is generated according to a dimming angle of the input voltage Vin. The comparison voltage VCOM is output as a dimming angle voltage DAV through the filtering circuit 69, and, as shown in FIG. 5, the dimming angle sensing voltage DAV has a level depending on the dimming angle.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS input current regulator 1, dimmer 2, bridge diode 3
switch mode power supply 4, input current regulator 10
bleeding circuit 10, sensing circuit 20, biasing circuit 30
first resistor 11, second resistor 13, MOSFET 12
shunt regulator 21, resistor 22, 32, 64, 66, and 67,
capacitor 23 and 68
diode 31, capacitor 33, switch control circuit 40
switch 41, first to third coil (CO1-O3), rectification diode (D)
output capacitor C, BJT 51, disable circuit 60
dimming angle shunt regulator 61, dimming angle sensing circuit 62 comparing circuit 63, filtering circuit 69, zener diode 65
What is claimed is:

1. An input current regulator comprising:
   a bleeding circuit generating a bleeding current from an input current passed through a dimmer;
   a sensing circuit sensing the input current, and controlling the bleeding circuit to generate the bleeding current according to a sense voltage corresponding to the input current when the input current is sensed by the sensing circuit to be smaller than a predetermined holding current of the dimmer; and
   a biasing circuit generating a power voltage for operation of the input current regulator during operation of a power supply.

2. The input current regulator of claim 1, wherein the biasing circuit generates the power voltage using an auxiliary voltage generated in an auxiliary coil coupled in an insulated manner with a primary side coil of the power supply with a predetermined turn ratio.

3. The input current regulator of claim 1, wherein the sensing circuit generates a sink current controlling a source current supplied to the bleeding circuit from the biasing circuit.

4. The input current regulator of claim 3, wherein the sensing circuit comprises a shunt regulator provided between a reference end and an input end to receive the sensing voltage and generating the sink current to the input end from an output end to maintain the sensing voltage with a predetermined reference voltage.

5. The input current regulator of claim 4, wherein the sensing circuit further comprises a first resistor connected between the input end and the reference end of the shunt regulator.

6. The input current regulator of claim 5, wherein the sensing circuit further comprises a capacitor coupled to the first resistor in parallel to filter the sensing voltage generated on the first resistor.

7. The input current regulator of claim 4, wherein the bleeding circuit comprises:
   a first resistor having a first end connected to a rectification circuit and the power supply; and
   a transistor having a first electrode connected to a second end of the first resistor and a control electrode connected to the output end of the shunt regulator.

8. The input current regulator of claim 7, wherein the bleeding circuit comprises a second resistor connected between a second electrode of the transistor and the reference end of the shunt regulator.

9. The input current regulator of claim 3, wherein the sensing circuit comprises a BJT (bipolar junction transistor) comprising a first electrode and a control electrode and receiving a sense voltage according to the input current as a voltage difference between the control electrode and the first electrode, and
   a sink current according to the voltage difference flows to the first electrode of the BJT from the second electrode of the BJT.

10. The input current regulator of claim 9, wherein the bleeding circuit comprises a first resistor having a first end connected to a rectification circuit and the power supply and a transistor having a first electrode connected to a second end of the first resistor and a control electrode connected to a second electrode of the BJT.

11. The input current regulator of claim 10, wherein the bleeding circuit comprises a second resistor connected between a second electrode of the transistor and a control electrode of the BJT.

12. The input current regulator of claim 2, wherein the biasing circuit comprises a diode connected to the auxiliary voltage and a capacitor charged by a current flowing through the diode, and the power voltage is a voltage charged in the capacitor.

13. The input current regulator of claim 12, wherein the sensing circuit comprises a shunt regulator having a reference end, an input end, and an output end, receiving the sense voltage according to the input current between the reference end and the input end, and generating a sink current flowing to the input end from the output end according to the sense voltage, and
   a capacitor of the biasing circuit has a first end connected to the output end of the shunt regulator through a resistor and a second end connected to an input end of the shunt regulator.

14. The input current regulator of claim 13, wherein the bleeding circuit comprises a transistor having a control electrode connected to the output end of the shunt regulator, a first electrode connected to the dimmer through a third resistor, and a second electrode connected to the reference end of the shunt regulator through a fourth resistor.

15. The input current regulator of claim 12, wherein the sensing circuit comprises a BJT (bipolar junction transistor) comprising a control electrode and a first electrode and receiving a sense voltage according to the input current as a voltage difference between the control electrode and the first electrode, a sink current according to the voltage difference flows to the first electrode of the BJT from a second electrode of the BJT, and a capacitor of the biasing circuit includes a first end connected with the second electrode of the BJT through a fifth resistor and a second end connected to the first electrode of the BJT.

16. The input current regulator of claim 15, wherein the bleeding circuit comprises a control electrode connected to the second electrode of the BJT, a first electrode connected to the dimmer through a third resistor, and a second electrode connected to a control electrode of the BJT through a fourth resistor.

17. The input current regulator of claim 1, wherein the sensing circuit senses the input current using a sum of the bleeding current and a current supplied from the power supply, and the current supplied from the power supply to the sensing circuit is a current flowing to a switch that controls power transmission of the power supply.

18. A disable circuit connected to the input current regulator of claim 1, the disable circuit comprising:
   a dimming angle sensing circuit generating a comparison voltage according to a comparison result of an input voltage generated from rectification of an AC input that has passed through the dimmer and generating a dimming angle sense voltage corresponding to a dimming angle of the dimmer by low-pass filtering the comparison voltage; and
   a dimming angle shunt regulator comprising a reference end, an input end, and an output end, the dimming angle shunt regulator being connected when a voltage between the reference end receiving the diming angle sense voltage and the input end is higher than a predetermined dimming angle reference voltage to generate a sink current flowing to the input end from the output end to which the power voltage is supplied.

19. The disable circuit of claim 18, wherein the comparison result is generated by a comparing circuit that comprises a zener diode receiving the input voltage from a sixth resistor and connected when the input voltage is higher than a zener voltage of the zener diode, and the comparison voltage is a voltage of a first node where the sixth resistor and the zener diode are connected.

20. The disable circuit of claim 18, wherein the comparison voltage is low-pass filtered by a filtering circuit that comprises seventh and eighth resistors connected between the comparison voltage and a ground and a capacitor connected between a second node where the seventh and eighth resistors are connected and the ground, and the dimming angle sense voltage is a voltage of the second node.

21. The disable circuit of claim 20, wherein the ground of the disable circuit is connected to the ground of the input current regulator.

22. The disable circuit of claim 20, wherein the ground of the disable circuit is connected to the ground of the power supply.

23. A driving method of a dimmer and an input current regulator provided in a power supply, the driving method comprising:
    generating a sink current according to a sense voltage that depends on an input current passed through the dimmer;
    generating a power voltage for operation of the input current regulator during operation of the power supply connected to the dimmer; and
    generating a bleeding current flowing into the input current regulator according to the sink current to control a current supplied to the power supply when the input current is less than a holding current of the dimmer.

24. The driving method of claim 23, wherein the power voltage is applied to a control electrode of a transistor through which the bleeding current flows, and
    wherein controlling the bleeding current comprises varying the power voltage according to the sink current.

25. The driving method of claim 24, wherein the generating the sink current comprises generating a sense voltage from a sum of a current flowing to a switch that controls power transmission of the power supply and the bleeding current.

26. The driving method of claim 23, further comprising:
    generating a comparison voltage according to a comparison result of an input voltage generated by rectifying a dimmer-passed AC input and a zener voltage;
    generating a dimming angle sense voltage corresponding to a dimming angle of the dimmer by low-pass filtering the comparison voltage; and
    decreasing of the power voltage by the sink current when the dimming angle sense voltage is higher than a predetermined dimming angle reference voltage.

* * * * *